US008618180B2

(12) United States Patent
Bruchmann et al.

(10) Patent No.: US 8,618,180 B2
(45) Date of Patent: Dec. 31, 2013

(54) HYPERBRANCHED POLYESTERS AND POLYCARBONATES AS DEMULSIFIERS FOR CRACKING CRUDE OIL EMULSIONS

(75) Inventors: Bernd Bruchmann, Freinsheim (DE); Andreas Eichhorn, Ellerstadt (DE); Marcus Guzmann, Mühlhausen (DE)

(73) Assignee: BASF SE (DE)

( * ) Notice: Subject to any disclaimer, the term of this patent is extended or adjusted under 35 U.S.C. 154(b) by 362 days.

(21) Appl. No.: 13/142,654

(22) PCT Filed: Dec. 21, 2009

(86) PCT No.: PCT/EP2009/067612
§ 371 (c)(1),
(2), (4) Date: Jun. 29, 2011

(87) PCT Pub. No.: WO2010/076253
PCT Pub. Date: Jul. 8, 2010

(65) Prior Publication Data
US 2011/0272327 A1 Nov. 10, 2011

(30) Foreign Application Priority Data
Dec. 29, 2008 (EP) ..................................... 08172997

(51) Int. Cl.
*C10G 33/04* (2006.01)
(52) U.S. Cl.
USPC ........... 516/135; 516/113; 516/136; 516/141; 516/143; 516/150; 516/154; 516/155; 516/157; 516/185; 516/186; 516/190; 208/188
(58) Field of Classification Search
USPC ................. 516/113, 135–136, 141, 143, 150, 516/154–155, 157, 185–186, 190; 208/188
See application file for complete search history.

(56) References Cited

U.S. PATENT DOCUMENTS

| 3,244,770 A | 4/1966 | Kirkpatrick et al. |
| 4,507,466 A | 3/1985 | Tomalia et al. |
| 4,568,737 A | 2/1986 | Tomalia et al. |
| 4,857,599 A | 8/1989 | Tomalia et al. |
| 5,460,750 A | 10/1995 | Diaz-Arauzo |
| 2009/0041813 A1* | 2/2009 | Bouillo et al. ................ 424/401 |

FOREIGN PATENT DOCUMENTS

| DE | 25 40 173 | 3/1977 |
| DE | 103 29 723 | 12/2004 |
| DE | 10 2005 006030 | 8/2006 |
| EP | 0 264 841 | 4/1988 |
| EP | 0 267 517 | 5/1988 |
| EP | 0 499 068 | 8/1992 |
| EP | 0 541 018 | 5/1993 |
| EP | 0 696 631 | 8/1994 |
| EP | 0 784 645 | 7/1997 |
| WO | WO 96/11225 | 4/1996 |
| WO | WO 2006/084816 | 8/2006 |
| WO | WO 2006/103251 | 10/2006 |

* cited by examiner

*Primary Examiner* — Brian McCaig
(74) *Attorney, Agent, or Firm* — Novak Druce Connolly Bove + Quigg LLP

(57) ABSTRACT

The invention relates to the use of nondendrimeric, high-functionality hyperbranched polyesters and polycarbonates which are obtainable by reacting
(i) at least one aliphatic, cycloaliphatic, araliphatic or aromatic dicarboxylic acid ($A_2$) or derivatives thereof, or organic carbonates ($A_2'$) with
(ii) at least one x-hydric aliphatic, cycloaliphatic, araliphatic or aromatic alcohol ($C_x$) which has more than two OH groups, where x is a number greater than 2, preferably from 3 to 8, more preferably from 3 to 6, even more preferably from 3 to 4 and especially 3, and
(iii) at least one fatty acid amide alkoxylate (D) of saturated or unsaturated $C_2$-$C_{30}$ fatty acid amides with an average of from 1 to 40 alkylene oxide units
as demulsifiers for splitting crude oil emulsions.

7 Claims, No Drawings

HYPERBRANCHED POLYESTERS AND POLYCARBONATES AS DEMULSIFIERS FOR CRACKING CRUDE OIL EMULSIONS

CROSS-REFERENCE TO RELATED APPLICATION

This application is a national stage application (under 35 U.S.C. §371) of PCT/EP2009/067612, filed Dec. 21, 2009, which claims benefit of European patent application 08172997.2, filed Dec. 29, 2008, the contents of each of which are incorporated herein by reference in their entireties.

FIELD OF THE INVENTION

The invention relates to the use of hyperbranched polyesters and polycarbonates as demulsifiers for splitting crude oil emulsions.

BACKGROUND

When extracted, mineral oil is generally obtained as a relatively stable water-oil emulsion. According to the age and deposit, this may comprise up to 95% by weight of water. The water may firstly be water already present in the deposit, and secondly water which is injected into the deposit in the course of secondary and/or tertiary mineral oil extraction through injection boreholes. Generally even greater amounts of salts are dissolved in the water, for example alkali metal or alkaline earth metal salts, and the emulsion typically further also comprises solids which are discharged from the borehole with the oil-water emulsion. The water-oil emulsions are stabilized by natural emulsifiers which occur in the crude oil, for example naphthenic acids. They may also additionally be stabilized by emulsifiers which do not occur naturally, for example surfactants which have been introduced into the mineral oil deposit for tertiary mineral oil extraction and are now discharged again with the oil thus extracted.

Water, salts and solids have to be removed before the processing of the crude oil in the refinery. Refineries frequently require that the water content of the crude oil supplied must not be more than 1%. For economic reasons, the water and the further components are removed from the crude oil while still at the site of extraction in order to avoid the uneconomic transport of water and to prevent or at least to minimize corrosion problems.

The phase separation of the water-oil emulsion should be as rapid and as complete as possible. Only in this way, in view of the large conveying volumes, can the apparatus for phase separation, for example settling tanks, be kept at a minimum size. On extraction platforms at sea, the use of very small, compact apparatus for phase separation is a necessity in construction terms owing to the limited space, and small systems of course generally require lower capital costs than large systems. A requirement often made is that the phase separation should not take more than approx. 20 to 30 min.

It is known that emulsion splitters (demulsifiers) can be used to accelerate the phase separation of oil-water emulsions. Emulsion splitters are interface-active substances which influence the oil-water interfaces and thus contribute to more rapid phase separation. EP-A 0 264 841 describes the use of linear copolymers composed of hydrophobic acrylic esters or methacrylic esters and hydrophilic ethylenically unsaturated monomers as mineral oil emulsion splitters.

EP-A 0 499 068 describes the preparation of reaction products of vinylic monomers and alcohol alkoxylates or phenol alkoxylates and their use as demulsifiers for crude oil emulsions.

U.S. Pat. No. 5,460,750 describes reaction products of phenol resins and alkylene oxides as emulsion splitters for crude oil emulsions.

EP-A 0 541 018 describes emulsion splitters prepared from polyethyleneimines having a weight-average molecular weight of up to 35 000 g/mol and ethylene oxide and propylene oxide, and a second active component used additionally is an alkylphenol-formaldehyde resin.

EP-A 0 784 645 describes the preparation of alkoxylates of polyamines, especially of polyethyleneimines and polyvinylamines, and their use as crude oil emulsion splitters.

EP-A 0 267 517 discloses branched polyamino esters as demulsifiers. The branched polyamino esters are obtained by reacting alkoxylated primary amines with triols and dicarboxylic acids.

In addition, dendrimeric polymers have been described as demulsifiers for crude oil.

U.S. Pat. No. 4,507,466 and U.S. Pat. No. 4,857,599 disclose dendrimeric polyamido amines. U.S. Pat. No. 4,568,737 discloses dendrimeric polyamido amines and hybrid dendrimers formed from polyamido amines, polyesters and polyethers, and their use as demulsifiers for crude oil. The preparation of dendrimers is very costly and inconvenient (see below), and these products are therefore very expensive and hardly usable in an economically viable manner in industrial scale applications.

DE 103 29 723 describes the preparation of alkoxylated dendrimeric polyesters and their use as biodegradable emulsion splitters. The dendrimeric polyesters used are based on a polyfunctional alcohol as the core molecule and a carboxylic acid which has at least two hydroxyl groups as a structural component. Structural components which have both an acid function and at least two hydroxyl functions, known as $AB_2$ units, are comparatively rare and therefore expensive. Moreover, the formation of dendrimers is inconvenient and costly (see below).

WO2006/084816 A1 discloses the use of nondendrimeric high-functionality hyperbranched polyesters which are obtainable by reacting at least one aliphatic, cycloaliphatic, araliphatic or aromatic dicarboxylic acid ($A_2$) or derivatives thereof with glyceryl monooleate or glyceryl monostearate ($B_2$) and at least one at least trifunctional alcohol ($C_x$) selected from glycerol, diglycerol, triglycerol, trimethylolethane, trimethylolpropane, 1,2,4-butanetriol, pentaerythritol, tris(hydroxyethyl) isocyanurate and polyetherols thereof based on ethylene oxide and/or propylene oxide as demulsifiers for splitting crude oil emulsions. The demulsifiers described there are still in need of improvement with regard to their splitting action.

BRIEF SUMMARY

It is an object of the present invention to provide further demulsifiers for splitting crude oil emulsions. These should be simple and inexpensive to prepare.

The object is achieved by the use of nondendrimeric, high-functionality hyperbranched polyesters and polycarbonates which are obtainable by reacting
(i) at least one aliphatic, cycloaliphatic, araliphatic or aromatic dicarboxylic acid ($A_2$) or derivatives thereof, or organic carbonates ($A_2'$) with
(ii) at least one x-hydric aliphatic, cycloaliphatic, araliphatic or aromatic alcohol ($C_x$) which has more than two OH groups, where x is a number greater than 2, preferably from 3 to 8, more preferably from 3 to 6, even more preferably from 3 to 4 and especially 3, and (iii) fatty acid amide alkoxylates of saturated or unsaturated $C_2$-$C_{30}$ fatty acid amides with an average of from 1 to 40 alkylene oxide units as demulsifiers for splitting crude oil emulsions.

DETAILED DESCRIPTION OF THE PREFERRED EMBODIMENTS

Dendrimers, arborols, Starburst polymers or hyperbranched polymers are names for polymers which feature a highly branched structure and a high functionality. Dendrimers are molecularly homogeneous macromolecules with a highly symmetric structure. Dendrimers can be prepared, proceeding from a central molecule, by controlled stepwise linkage of in each case two or more di- or polyfunctional monomers to each monomer already bonded. With each linkage step, this multiplies the number of monomer end groups (and hence of the linkages) by the factor of 2 or higher, and monodisperse polymers built up generation by generation with treelike structures, ideally spherical, are obtained, whose branches in each case comprise exactly the same number of monomer units. Owing to this perfect structure, the polymer properties are advantageous; for example, a surprisingly low viscosity and a high reactivity are observed owing to the high number of functional groups at the sphere surface. However, the preparation of the monodisperse dendrimers is complicated by the fact that protecting groups have to be introduced and removed again in each linkage step and intensive cleaning operations are required before the start of each new growth stage, and dendrimers are therefore typically prepared only on the laboratory scale.

In contrast, hyperbranched polymers are both molecularly and structurally inhomogeneous. They are not obtained by being built up generation by generation. It is therefore also unnecessary to isolate and to purify intermediates. Hyperbranched polymers can be obtained by simply mixing the components required to form them and the reaction thereof in a so-called one-pot reaction. Hyperbranched polymers may have dendrimeric substructures. In addition, however, they also have linear polymer chains and nonidentical polymer branches. For the synthesis of the hyperbranched polymers, especially so-called $AB_x$ monomers are suitable. These have two different functional groups A and B in one molecule, which can react intermolecularly with one another to form a bond. Functional group A is present only once per molecule, and functional group B twice or more than twice. The reaction of said $AB_x$ monomers with one another forms uncrosslinked polymers with branching sites in a regular arrangement. The polymers have almost exclusively B groups at the chain ends.

In addition, hyperbranched polymers can be prepared via the $A_x$+$B_y$ synthesis route. In this case, $A_x$ and $B_y$ represent two different monomers with the functional groups A and B, and the indices x and y the number of functional groups per monomer. In the $A_x$+$B_y$ synthesis, represented here using the example of an $A_2$+$B_3$ synthesis, a difunctional monomer $A_2$ is reacted with a trifunctional monomer $B_3$. This initially forms a 1:1 adduct of A and B with an average of one functional A group and two functional B groups, which can then likewise react to give a hyperbranched polymer. The hyperbranched polymers thus obtained also have predominantly B groups as end groups.

In the context of the invention, the term "hyperbranched" in connection with the polymers means that the degree of branching (DB) of the substances in question, which is defined as $$DB\,(\%) = \frac{T+Z}{T+Z+L} \times 100,$$

where T is the mean number of terminally bound monomer units, Z is the mean number of monomer units which form branches and L is the mean number of monomer units bonded linearly into the macromolecules of the particular substances, is from 10 to 95%, preferably 25-90% and more preferably from 30 to 80%.

The nondendrimeric hyperbranched polymers used in accordance with the invention differ from the dendrimeric polymers by virtue of the degree of branching thus defined. In connection with the present invention, the polymers are "dendrimeric" when their degree of branching DB=99.9-100%. A dendrimer thus has the maximum possible number of branching sites, which can be achieved only by highly symmetric formation. For a definition of the "degree of branching", see also H. Frey et al., Acta Polym. 1997, 48, 30.

In the context of this invention, hyperbranched polymers are understood to mean essentially uncrosslinked macromolecules which are both structurally and molecularly inhomogeneous. They can, proceeding from a central molecule, be formed analogously to dendrimers, but with inhomogeneous chain length of the branches. However, they can also be formed linearly with functional pendant branches or else, as a combination of the two extremes, have linear and branched molecular moieties. For a definition of dendrimeric and hyperbranched polymers, see also P. J. Flory, J. Am. Chem. Soc. 1952, 74, 2718 and H. Frey et al., Chem. Eur. J. 2000, 6, No. 14, 2499.

According to the invention, hyperbranched polyesters and hyperbranched polycarbonates, i.e. nondendrimeric polymers in the sense of the above definition, i.e. molecularly and structurally inhomogeneous polymers, are used as demulsifiers.

Hyperbranched polymers having functional groups can be synthesized in a manner known in principle using $AB_x$, preferably $AB_2$ or $AB_3$, monomers. The $AB_x$ monomers may, on the one hand, be incorporated into the hyperbranched polymer completely in the form of branches, they can be incorporated as terminal groups, i.e. still have x free B groups, and they may be incorporated as linear groups with (x−1) free B groups. The resulting hyperbranched polymers have, according to the degree of polymerization, a greater or lesser number of B groups, either terminally or as side groups. Further information about hyperbranched polymers and synthesis thereof can be found, for example, in J.M.S.—Rev. Macromol. Chem. Phys., C37(3), 555 to 579 (1997) and the literature cited there.

Hyperbranched Polyesters

Inventive demulsifiers are obtainable by reacting
(i) at least one aliphatic, cycloaliphatic, araliphatic or aromatic dicarboxylic acid ($A_2$) or derivatives thereof with
(ii) at least one x-hydric aliphatic, cycloaliphatic, araliphatic or aromatic alcohol ($C_x$) which has more than two OH groups, where x is a number greater than 2, preferably from 3 to 8, more preferably from 3 to 6, even more preferably from 3 to 4 and especially 3, and
(iii) at least one fatty acid amide alkoxylate (D) of a saturated or unsaturated $C_2$-$C_{30}$ fatty acid amide with an average of from 1 to 40 alkylene oxide units.

Preference is given to selecting the ratio of the reactive groups in the reaction mixture so as to establish a molar ratio of OH groups to carboxyl groups or derivatives thereof of from 5:1 to 1:5, preferably from 4:1 to 1:4, more preferably from 3:1 to 1:3 and most preferably from 2:1 to 1:2.

In the context of this invention, hyperbranched polyesters are understood to mean uncrosslinked polyesters with hydroxyl and carboxyl groups, which are both structurally and molecularly inhomogeneous. In the context of this document, "uncrosslinked" means that a degree of crosslinking of less than 15% by weight, preferably of less than 10% by weight, determined over the insoluble component of the polymer, is present. The insoluble component of the polymer was determined by extracting for four hours with the same solvent as used for gel permeation chromatography, i.e. tetrahydrofuran or hexafluoroisopropanol according to the solvent in which the polymer has better solubility, in a Soxhlet apparatus, drying the residue to constant weight and weighing the remaining residue.

The dicarboxylic acids ($A_2$) include, for example, aliphatic dicarboxylic acids such as oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid. In addition, it is also possible to use aromatic dicarboxylic acids, for example phthalic acid, isophthalic acid or terephthalic acid. It is also possible to use unsaturated dicarboxylic acids, such as maleic acid or fumaric acid.

The dicarboxylic acids mentioned may also be substituted by one or more radicals selected from $C_1$-$C_{26}$-alkyl or -alkenyl groups, $C_3$-$C_{12}$-cycloalkyl groups or $C_6$-$C_{14}$-aryl groups. Illustrative representatives of substituted dicarboxylic acids include: 2-methylmalonic acid, 2-ethylmalonic acid, 2-phenylmalonic acid, 2-methylsuccinic acid, 2-ethylsuccinic acid, dodecenylsuccinic acid, oleylsuccinic acid, $C_{16}$-$C_{18}$ alkenylsuccinic acid, 2-phenylsuccinic acid, itaconic acid and 3,3-dimethylglutaric acid.

In addition, it is possible to use mixtures of two or more of the aforementioned dicarboxylic acids.

The dicarboxylic acids can be used either as such or in the form of derivatives thereof.

It is also possible to use a mixture of a dicarboxylic acid and one or more of the derivatives thereof. It is equally possible to use a mixture of a plurality of different derivatives of one or more dicarboxylic acids.

Particular preference is given to using malonic acid, succinic acid, glutaric acid, adipic acid, 1,2-, 1,3- or 1,4-cyclohexanedicarboxylic acid (hexahydrophthalic acids), $C_{12}$-$C_{24}$-alkenylsuccinic acids, phthalic acid, isophthalic acid, terephthalic acid or the mono- or dialkyl esters thereof.

Derivatives are the relevant anhydrides in monomeric or else polymeric form, mono- or dialkyl esters, preferably mono- or di-$C_1$-$C_4$-alkyl esters, more preferably mono- or dimethyl esters or the corresponding mono- or diethyl esters, and also mono- and divinyl esters and mixed esters, preferably mixed esters with different $C_1$-$C_4$-alkyl components, more preferably mixed methyl ethyl esters.

At least trifunctional alcohols ($C_x$) comprise glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, diglycerol, triglycerol or higher condensation products of glycerol, di(trimethylolpropane), di(pentaerythritol), trishydroxymethyl isocyanurate, tris(hydroxyethyl) isocyanurate (THEIC), tris(hydroxypropyl) isocyanurate, inositols or sugars, for example glucose, fructose or sucrose, sugar alcohols, for example sorbitol, mannitol, threitol, erythritol, adonitol (ribitol), arabitol (lyxitol), xylitol, dulcitol (galactitol), maltitol, isomaltitol, trifunctional or higher-functionality polyethers based on tri- or higher-functionality alcohols and ethylene oxide, propylene oxide and/or butylene oxide.

Preferred at least trifunctional alcohols ($C_x$) are glycerol, diglycerol, triglycerol, trimethylolethane, trimethylolpropane, 1,2,4-butanetriol, pentaerythritol, tris(hydroxyethyl) isocyanurate, and the polyetherols thereof based on ethylene oxide and/or propylene oxide with an average of from 1 to 40, preferably from 1 to 24 and more preferably from 1 to 16 alkylene oxide units per starter molecule.

These polyfunctional alcohols can also be used in a mixture with difunctional alcohols ($B_2$), with the proviso that the mean OH functionality of all alcohols used together is greater than 2, preferably at least 2.1. Examples of suitable compounds with two OH groups comprise ethylene glycol, diethylene glycol, triethylene glycol, 1,2- and 1,3-propanediol, dipropylene glycol, tripropylene glycol, neopentyl glycol, 1,2-, 1,3- and 1,4-butanediol, 1,2-, 1,3- and 1,5-pentanediol, hexanediol, cyclopentanediol, cyclohexanediol, cyclohexanedimethanol, difunctional polyetherols or polyesterols.

The dicarboxylic acid ($A_2$) and the at least trifunctional alcohol ($C_x$) are converted in the presence of a fatty acid amide alkoxylate (D) of a saturated or unsaturated $C_2$-$C_{30}$ fatty acid amide with an average of from 1 to 40 alkylene oxide units, preferably from 2 to 30 alkylene oxide units.

Alternatively, it is possible first to react the dicarboxylic acid ($A_2$) and the at least trifunctional alcohol ($C_x$) with one another, and then to esterify the resulting hyperbranched polyesters later by reacting with the fatty acid amide alkoxylates (D), if appropriate in the presence of further dicarboxylic acid ($A_2$).

Alternatively, it is also possible first to react the dicarboxylic acid ($A_2$) and the at least trifunctional alcohol ($C_x$) with one another, and then to functionalize the resulting hyperbranched polyesters by reacting with the fatty acid amide alkoxylates (D).

The alkylene oxide units present in the fatty acid amide alkoxylates (D) are generally ethylene oxide units or propylene oxide units and mixtures thereof. Preferred fatty acid amide alkoxylates are pure fatty acid amide ethoxylates.

Suitable fatty acid amide alkoxylates are derived from saturated or unsaturated monocarboxylic acids, also known as fatty acids, having from 2 to 30 carbon atoms. Examples are acetic acid, propionic acid, butyric acid, valeric acid, isobutyric acid, trimethylacetic acid, caproic acid, caprylic acid, heptanoic acid, capric acid, pelargonic acid, lauric acid, myristic acid, palmitic acid, cerotic acid, montanic acid, stearic acid, isostearic acid, nonanoic acid and 2-ethylhexanoic acid.

Examples of unsaturated fatty acids are crotonic acid, isocrotonic acid, vinylacetic acid, elaidic acid, oleic acid, sorbic acid, ricinoleic acid, linoleic acid, linolenic acid, erucic acid, eleostearic acid, arachidonic acid, clupanodonic acid, or fatty acids from vegetable or animal fats and oils based on, for example, soya, coconut, rape, olives, linseeds, castor, sunflowers, fish or marine animals.

The fatty acid amide alkoxylates are preferably derived from saturated or unsaturated fatty acids having from 12 to 22 carbon atoms.

Particularly preferred fatty acid amides derive from stearic acid, oleic acid, linoleic acid or linolenic acid.

Very particular preference is given to stearamide ethoxylates, oleamide ethoxylates, linoleamide ethoxylates or linolenamide ethoxylates with an average of from 2 to 30, preferably from 2 to 20, more preferably from 4 to 15 and especially from 8 to 12 ethylene oxide units.

In the preparation of the polyesters, the fatty acid amide alkoxylate (D) is preferably used together with the dicarboxylic acid ($A_2$) and the alcohol ($C_x$). The mixture of the alcohols is selected such that $C_x$:D are in a molar ratio of from 95:5 to 30:70, preferably from 90:10 to 40:60 and more preferably 80:20 to 50:50.

The reaction can be performed in the presence or absence of a solvent. Suitable solvents are, for example, hydrocarbons such as paraffins, aromatics, ethers and ketones. Preference is given to performing the reaction free of solvents. The reaction can be effected in the presence of a water-withdrawing agent as an additive, which is added at the start of the reaction. Suitable examples include molecular sieves, especially 4 Å molecular sieve, $MgSO_4$ and $Na_2SO_4$. It is also possible to distill off water or alcohol formed during the reaction, if appropriate under reduced pressure or, for example, to use a water separator in which the water is removed with the aid of an azeotroping agent.

The reaction can be performed in the absence of catalysts. However, preference is given to working in the presence of at least one catalyst. The catalysts are preferably acidic organic, organometallic or organic catalysts, or mixtures of a plurality of acidic inorganic, organometallic or organic catalysts.

Acidic inorganic catalysts include, for example, sulfuric acid, sulfates and hydrogensulfates, such as sodium hydrogensulfate, phosphoric acid, phosphonic acid, hypophosphorous acid, aluminum sulfate hydrate, alum, acidic silica gel (pH ≤6, especially ≤5), and acidic alumina. In addition, preferred examples include aluminum compounds of the general formula $Al(OR^1)_3$ and titanates. Preferred acidic organometallic catalysts are additionally dialkyltin oxides or dialkyltin esters. Preferred acidic organic catalysts are acidic organic compounds with, for example, phosphate groups, sulfonic acid groups, sulfate groups or phosphonic acid groups. It is also possible to use acidic ion exchangers as acidic organic catalysts.

The reaction is performed at temperatures of from 60 to 250° C.

The hyperbranched polyesters used in accordance with the invention have a molecular weight $M_w$ of at least 500, preferably at least 600 and more preferably 1000 g/mol. The upper limit of the molecular weight $M_w$ is preferably 150 000 g/mol, more preferably not more than 100 000 and most preferably not more than 80 000 g/mol. The hyperbranched polyesters preferably have a molecular weight $M_w$ in the range from 500 to 50 000 g/mol, more preferably in the range from 1000 to 30 000 g/mol.

The figures for the polydispersity and for the number-average and weight-average molecular weights $M_n$ and $M_w$ are based here on gel permeation chromatography measurements, polymethyl methacrylate having been used as the standard, and tetrahydrofuran, dimethylformamide, dimethylacetamide or hexafluoroisopropanol as eluent. The method is described in Analytiker Taschenbuch [Analyst's Handbook] Vol. 4, pages 433 to 442, Berlin 1984.

The polydispersity of the polymers used in accordance with the invention is generally from 1.2 to 50, preferably from 1.4 to 40, more preferably from 1.5 to 30 and most preferably from 2 to 30.

The hyperbranched polyesters used in accordance with the invention exhibit a better splitting action than hyperbranched polyesters modified with stearic acid, which are described in WO2006/084816. In addition, as a result of the reaction, they have a lower molecular weight than the hyperbranched polyesters modified with stearic acid. This has performance advantages in that the solutions of the polymers are less viscous and the polymers can therefore be dissolved in a higher concentration.

Hyperbranched Polycarbonates

Hyperbranched polycarbonates suitable as demulsifiers in accordance with the invention are prepared by reacting
(i) at least one organic carbonate ($A_2$') with
(ii) at least one x-hydric aliphatic, cycloaliphatic, araliphatic or aromatic alcohol ($C_x$) which has more than two OH groups, where x is a number greater than 2, preferably from 3 to 8, more preferably from 3 to 6, even more preferably from 3 to 4 and especially 3, and
(iii) at least one fatty acid amide alkoxylate (D) of a saturated or unsaturated $C_2$-$C_{30}$ fatty acid amide with an average of from 1 to 40 alkylene oxide units.

The preparation of the hyperbranched polycarbonates preferably comprises the steps of
a) reacting at least one organic carbonate ($A_2$) of the general formula RO(CO)OR with the at least one aliphatic alcohol ($C_x$) which has more than 2 OH groups with elimination of alcohols ROH to give one or more condensation products (K), where R is in each case independently a straight-chain or branched aliphatic, araliphatic or aromatic hydrocarbon radical having from 1 to 20 carbon atoms, and
b) intermolecularly converting the condensation products (K) to a high-functionality hyperbranched polycarbonate,
where the quantitative ratio of the OH groups to the carbonates in the reaction mixture is selected such that the condensation products (K) have an average either of one carbonate group and more than one OH group or of one OH group and more than one carbonate group,
the reaction in step a) being performed in the presence of at least one fatty acid amide alkoxylate (D) of saturated or unsaturated $C_2$-$C_{30}$ fatty acid amides with an average of from 1 to 40 alkylene oxide units, or the hyperbranched polycarbonate obtained in steps a) and b) is then reacted with the fatty acid amide (D).

The R radicals of the organic carbonate ($A_2$') of the general formula RO(CO)OR used as starting material are in each case independently a straight-chain or branched aliphatic, araliphatic or aromatic hydrocarbon radical having from 1 to 20 carbon atoms. The two R radicals may also be joined to one another to form a ring. The radical is preferably an aliphatic hydrocarbon radical and more preferably a straight-chain or branched alkyl radical having from 1 to 5 carbon atoms.

Dialkyl or diaryl carbonates can be prepared, for example, from the reaction of aliphatic, araliphatic or aromatic alcohols, preferably monoalcohols, with phosgene. In addition, they can also be prepared via oxidative carbonylation of the alcohols or phenols by means of CO in the presence of noble metals, oxygen or $NO_x$. For preparation methods of diaryl or dialkyl carbonates, see also "Ullmann's Encyclopedia of Industrial Chemistry", 6th Edition, 2000 Electronic Release, Verlag Wiley-VCH.

Examples of suitable carbonates comprise aliphatic or aromatic carbonates such as ethylene carbonate, 1,2- or 1,3-propylene carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate and didodecyl carbonate.

Preference is given to using aliphatic carbonates, especially those in which the radicals comprise from 1 to 5 carbon atoms, for example ethylene carbonate, 1,2- or 1,3-propylene carbonate, dimethyl carbonate, diethyl carbonate, dipropyl carbonate, dibutyl carbonate or diisobutyl carbonate.

The organic carbonates are reacted with at least one aliphatic alcohol ($C_x$) which has at least 3 OH groups, or mixtures of two or more different alcohols.

Examples of compounds having at least three OH groups are glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, bis(trimethylolpropane) or sugars, for example glucose, trifunctional or higher-functionality polyetherols based on trifunctional or higher-functionality alcohols and ethylene oxide, propylene oxide or butylene oxide, or polyesterols.

Preferred at least trifunctional alcohols are glycerol, diglycerol, triglycerol, trimethylolethane, trimethylolpropane, 1,2,4-butanetriol, pentaerythritol, tris(hydroxyethyl) isocyanurate and the polyetherols thereof based on ethylene oxide and/or propylene oxide with an average of from 1 to 40, preferably from 1 to 24 and more preferably from 1 to 16 alkylene oxide units per starter molecule.

These polyfunctional alcohols can also be used in a mixture with difunctional alcohols ($B_2$), with the proviso that the mean OH functionality of all alcohols used together is greater than 2, preferably at least 2.1. Examples of suitable compounds with two OH groups comprise ethylene glycol, diethylene glycol, triethylene glycol, 1,2- and 1,3-propanediol, dipropylene glycol, tripropylene glycol, neopentyl glycol, 1,2-, 1,3- and 1,4-butanediol, 1,2-, 1,3- and 1,5-pentanediol, hexanediol, cyclopentanediol, cyclohexanediol, cyclohexanedimethanol, difunctional polyether- or polyesterols.

The carbonate is reacted with the alcohol or alcohol mixture to give the inventive high-functionality hyperbranched polycarbonate used with elimination of the monofunctional alcohol or phenol from the carbonate molecule.

The high-functionality hyperbranched polycarbonates formed by the process outlined have been terminated after the reaction, i.e. without any further modification, by hydroxyl groups and/or by carbonate groups. They dissolve readily in different solvents, for example in water, alcohols such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate.

In the context of this invention, a high-functionality polycarbonate is understood to mean a product which, as well as the carbonate groups which form the polymer skeleton, additionally has, in terminal or lateral positions, at least four and preferably at least eight functional groups. The functional groups are carbonate groups and/or OH groups. There is in principle no upper limit in the number of terminal or lateral functional groups, but products with a very high number of functional groups may have undesired properties, for example high viscosity or poor solubility. The high-functionality polycarbonates of the present invention usually have not more than 500 terminal or lateral functional groups, preferably not more than 100 and especially not more than 30 terminal or lateral functional groups.

The reaction in step a) of organic carbonates with aliphatic polyols is performed in the presence of at least one fatty acid amide alkoxylate of saturated or unsaturated $C_2$-$C_{30}$ fatty acid amides with an average of from 1 to 40 alkylene oxide units. Alternatively, it is also possible to react the hyperbranched polycarbonate obtained in steps a) and b) subsequently with the fatty acid amide.

Suitable fatty acid amide alkoxylates have already been described above in connection with the hyperbranched polyesters.

The fatty acid amide alkoxylates are preferably derived from saturated or unsaturated fatty acids having from 12 to 22 carbon atoms.

Particularly preferred fatty acid amides derive from stearic acid, oleic acid, linoleic acid or linolenic acid.

Very particular preference is given to stearamide ethoxylates, oleamide ethoxylates, linoleamide ethoxylates or linolenamide ethoxylates with an average of from 2 to 30, preferably from 2 to 20, more preferably from 4 to 15 and especially from 8 to 12 ethylene oxide units.

In the preparation of the polycarbonates, the fatty acid amide alkoxylate (D) is preferably used together with the organic carbonate ($A_2$') and the alcohol ($C_x$). The mixture of the alcohols is selected such that $C_x$:D are in a molar ratio of from 95:5 to 30:70, preferably from 90:10 to 40:60 and more preferably from 80:20 to 50:50.

The hyperbranched polycarbonates used in accordance with the invention have a molecular weight $M_w$ of at least 500, preferably at least 800 and more preferably 1000 g/mol. The upper limit in the molecular weight $M_w$ is preferably 200 000 g/mol, more preferably not more than 150 000 and most preferably not more than 100 000 g/mol. The hyperbranched polycarbonates preferably have a molecular weight $M_w$ in the range from 500 to 100 000 g/mol, more preferably in the range from 800 to 80 000 g/mol and especially from 1000 to 50 000 g/mol.

According to the invention, the hyperbranched polyesters and polycarbonates are used to split oil-water emulsions, especially crude oil emulsions. The term "oil-water emulsions" here shall comprise both water-in-oil and oil-in-water emulsions. The oil-water emulsions may comprise, for example, from 0.1 to 99% by weight of water, or salt water. The demulsifiers used in accordance with the invention can preferably be used to separate oil-water emulsions, preferably crude oil-water emulsions, with a water or salt water content of from 1 to 98% by weight, more preferably from 5 to 97% by weight and most preferably from 10 to 95% by weight. The oil components may be oil components of any origin.

The hyperbranched polyesters and polycarbonates are added to the oil-water emulsions, especially to the crude oil emulsions, for splitting preferably in dissolved form. The solvents used may include water, alcohols such as methanol, ethanol, propanol, isopropanol, butanol, ethers such as tetrahydrofuran or dioxane, paraffinic solvents such as hexane, cyclohexane, heptane, octane, isooctane or light petroleum fractions, or aromatic solvents such as toluene, xylene or Solvent Naphtha. Useful demulsifier concentrations in the solution have been found to be from 10 to 90% by weight.

The amount (in ppm by weight) of the alkoxylated polyalkanolamines used in accordance with the invention, based on the oil content of the crude oil emulsion, is generally from 0.1 ppm to 5000 ppm, preferably from 1 ppm to 3000 ppm, more preferably from 2 ppm to 1000 ppm and especially from 5 ppm to 500 ppm.

Plants and processes for splitting crude oil emulsions are known to those skilled in the art. The emulsion is typically split on site, i.e. still at the oilfield. The plant may be one at a production borehole or a central plant in which the splitting of the crude oil emulsions for several production boreholes of an oilfield is undertaken together.

Even at the temperature of the freshly extracted crude oil emulsions, the splitting proceeds at such a rate that the emulsion can be split actually on the way to the processing plant. This broken emulsion is then separated in an optionally heated separator and possibly with the aid of an electrical field into pure oil and water, or salt water. The separators may be plants which separate only under the influence of gravity, i.e., for example, settling tanks or else other separators, for example hydrocyclones.

The crude oil emulsion is separated generally at from 10 to 130° C., preferably at from 40 to 90° C.

Since crude oils consist of a mixture of many chemical compounds, it is generally necessary, owing to the different chemical composition of the oil, the water and salt contents and the specific conditions of the emulsion splitting, such as temperature, duration of emulsion splitting, type of metered addition and interactions with further components of the mixture, to adjust the demulsifier to the specific conditions.

The hyperbranched polyesters and polycarbonates used in accordance with the invention can of course also be used in a mixture with other crude oil demulsifiers. The further crude oil demulsifiers may, for example, be oxyalkylated phenol-formaldehyde resins, EO/PO block copolymers or EO/PO block copolymers crosslinked with adipic acid, crosslinked diepoxides, polyamides or alkoxylates thereof, salts of the sulfonic acids or ethoxylated and/or propoxylated polyethyleneimines. It is possible with preference to use EO/PO block copolymers, EO/PO block copolymers esterified with adipic acid, or ethoxylated and/or propoxylated polyethyleneimines. Corresponding crude oil demulsifiers are disclosed, for example, in DE 25 40 173 or EP 541 018 B1. The alkoxylated polyalkanolamines used in accordance with the invention can particularly advantageously also be combined with proteins for emulsion splitting, especially with hydrophobins. Further details regarding hydrophobins as emulsion splitters are disclosed in WO 2006/103251.

The invention is illustrated in detail with reference to the following examples.

EXAMPLES

Example 1

Preparation of a Hyperbranched Polyester 300 g of adipic acid, 160.7 g of glycerol and 221.7 g of an oleamide ethoxylate (molecular weight 720 g/mol, average of 10 ethylene oxide units per amide group, LUTENSOL FSA 10, BASF SE) and 0.1 g of dibutyltin dilaurate were initially charged in a 2000 ml glass flask equipped with stirrer, internal thermometer, descending condenser and vacuum connection with a cold trap, and the mixture was heated to an internal temperature of 120° C. for melting with the aid of an oil bath. The stirrer was then activated and heated further until an internal temperature of 160° C. was attained. At this temperature, the elimination of water set in. The temperature was increased slowly to 190° C. and water was distilled off continuously. After about 2 h at 190° C., 51 g of water had been distilled off. The temperature in the flask was lowered to 180° C. and the pressure was reduced slowly to 50 mbar, in order to remove further water formed in the reaction and any low-boiling by-products. The reaction mixture was kept at the temperature specified and the pressure specified for another 1.5 h. After cooling, the molecular weight of the polymer was determined by gel permeation chromatography with tetrahydrofuran as the eluent against PMMA standard.

Mn=900 g/mol, Mw=3900 g/mol.

Example 2

Preparation of a Hyperbranched Polycarbonate

A four-neck flask equipped with stirrer, reflux condenser, gas inlet tube and internal thermometer was initially charged with 189 g of a triol based on trimethylolpropane, randomly ethoxylated with 3 ethylene oxide units, 216 g of an oleamide ethoxylate (molecular weight 720 g/mol, average of 10 ethylene oxide units per amide group, LUTENSOL FSA 10, BASF SE), 118 g of diethyl carbonate and 0.7 g of potassium hydroxide, and the mixture was heated to 150° C. with stirring and left to react under reflux at this temperature. With advancing reaction time, the boiling temperature of the reaction mixture was reduced, caused by the evaporative cooling of the ethanol released which set in. At a boiling temperature of 114° C., the reflux condenser was exchanged for a descending condenser, ethanol was distilled off and the temperature of the reaction mixture was increased slowly up to 180° C. After the ethanol had been distilled off, the mixture was cooled to 140° C., the pressure was reduced to 8 mbar and the reaction product was degassed under a gentle nitrogen stream in order to remove volatile fractions.

After cooling, the molecular weight of the polymer was determined by gel permeation chromatography with dimethylacetamide as the eluent against PMMA standard.

Mn=1600 g/mol, Mw=3600 g/mol.

Example 3

Testing of the suitability of the hyperbranched polymers as a demulsifier by measuring the splitting of water from a crude oil emulsion 5 g of the hyperbranched polymer to be tested were weighed into a 100 ml standard flask which was made up to the mark with 3:1 xylene/isopropanol mixture (based on volume), and the hyperbranched polymer was dissolved therein by shaking.

A crude oil emulsion from Wintershall AG, Emlichheim, probe 87, with a water content of 55% by volume, was heated to a temperature of 52° C. in a vessel which had not been sealed firmly in a waterbath for approx. 2 h.

The crude oil emulsion was homogenized by shaking for approx. 30 sec, and in each case 100 ml of the oil emulsion were introduced into 100 ml shaking cylinders. The oil-filled shaking cylinders were inserted into the waterbath.

An Eppendorf pipette was used to meter in each case 50 μl of the 5% by weight solution of the polymer to be tested into a shaking cylinder containing crude oil emulsion, and the cylinder was closed with a glass stopper. Thereafter, the shaking cylinder was taken out of the waterbath, shaken 60 times and decompressed. The shaking cylinder was then placed back into the waterbath and the stopwatch was started. The volume of the water which then separated out was read off after 15, 30, 45, 60, 120 and 240 min. The results are reproduced in table 1.

| Polymer from example | Water separated out in ml | | | | | |
| --- | --- | --- | --- | --- | --- | --- |
| | 15 min | 30 min | 45 min | 60 min | 120 min | 240 min |
| 1 | 0 | 2 | 5 | 12 | 27 | 36 |
| 2 | 0 | 2 | 4 | 10 | 26 | 34 |

The invention claimed is:
1. A process for splitting a crude oil emulsion, comprising the steps of adding one or more nondendrimeric, high-functionality hyperbranched polyesters or polycarbonates as demulsifiers which are obtainable by reacting

(i) at least one aliphatic, cycloaliphatic, araliphatic or aromatic dicarboxylic acid ($A_2$) or derivatives thereof, or organic carbonates ($A_2'$) with (ii) at least one x-hydric aliphatic, cycloaliphatic, araliphatic or aromatic alcohol ($C_x$) which has more than two OH groups, where x is a number greater than 2, and (iii) at least one fatty acid amide alkoxylate (D) of saturated or unsaturated $C_2$-$C_{30}$ fatty acid amides with an average of from 1 to 40 alkylene oxide units to the crude oil emulsion, and separating the emulsion into oil and water or salt water.

2. The process of claim 1, wherein the dicarboxylic acid ($A_2$) or derivative thereof is selected from the group consisting of malonic acid, succinic acid, glutaric acid, adipic acid, 1,2-, 1,3-, or 1,4-cyclohexanedicarboxylic acid (hexahydrophthalic acids), phthalic acid, isophthalic acid, terephthalic acid, and the mono- and dialkyl esters thereof.

3. The process of claim 1, wherein the organic carbonate ($A_2'$) is selected from the group consisting of ethylene carbonate, 1,2- or 1,3-propylene carbonate, dimethyl carbonate, diethyl carbonate, dipropyl carbonate, dibutyl carbonate or diisobutyl carbonate.

4. The process of claim 1, wherein the alcohol ($C_x$) having more than 2 OH groups is selected from the group consisting of glycerol, diglycerol, triglycerol, trimethylolethane, trimethylolpropane, 1,2,4-butanetriol, pentaerythritol, tris(hydroxyethyl)isocyanurate and the polyetherols thereof based on ethylene oxide and/or propylene oxide with an average of from 1 to 40 alkylene oxide units per starter molecule.

5. The process of claim 1, wherein the fatty acid amide alkoxylate (D) is derived from saturated or unsaturated fatty acids having from 12 to 22 carbon atoms.

6. The process of claim 5, wherein the fatty acid amide alkoxylate (D) is derived from fatty acids selected from the group consisting of stearic acid, oleic acid, linoleic acid and linolenic acid.

7. The process of claim 6, wherein the fatty acid amide alkoxylate is an oleamide ethoxylate with an average of from 8 to 12 ethylene oxide units.

\* \* \* \* \*